(12) United States Patent
Bjøntegaard

(10) Patent No.: US 7,822,125 B2
(45) Date of Patent: Oct. 26, 2010

(54) METHOD FOR CHROMA DEBLOCKING

(75) Inventor: Gisle Bjøntegaard, Oppegard (NO)

(73) Assignee: Tandberg Telecom AS, Lysaker (NO)

( * ) Notice: Subject to any disclaimer, the term of this patent is extended or adjusted under 35 U.S.C. 154(b) by 1463 days.

(21) Appl. No.: 11/153,243

(22) Filed: Jun. 14, 2005

(65) Prior Publication Data
US 2006/0018386 A1 Jan. 26, 2006

(30) Foreign Application Priority Data
Jun. 14, 2004 (NO) ................................ 20042477

(51) Int. Cl.
*H04N 7/18* (2006.01)
(52) U.S. Cl. .............................. 375/240.29; 375/240.25
(58) Field of Classification Search ................................ 375/240.01–240.29
See application file for complete search history.

(56) References Cited

U.S. PATENT DOCUMENTS

| 6,215,425 | B1 | 4/2001 | Andrews et al. |
| 6,690,838 | B2 | 2/2004 | Zhou |
| 7,319,415 | B2 * | 1/2008 | Gomila .................. 341/50 |
| 2001/0020906 | A1 | 9/2001 | Andrews et al. |
| 2003/0206587 | A1 | 11/2003 | Gomila |
| 2004/0190626 | A1 | 9/2004 | Sun et al. |

FOREIGN PATENT DOCUMENTS

JP 2002-330436 11/2002

OTHER PUBLICATIONS

Advanced video coding for generic audiovisual services, International Telecommunication Union, H.264 (May 2003), pp. 144-153.
Thomas Wiegand, "Joint Committee Draft (CD)", Joint Video Team (JVT) of ISO/IEC MPEG and ITU-T VCEG, 3$^{rd}$ Meeting, Fairfax, Virginia, USA, May 6-10, 2002, pp. 58-63.
Peter List, et al., "Adaptive Deblocking Filter", IEEE Transactions on Circuits and Systems for Video Technology, vol. 13, No. 7, XP-011221094, Jul. 1, 2003, pp. 614-619.
Anthony Joch, "Loop Filter Simplification and Improvement", Joint Video Team (JVT) of ISO/IEC MPEG & ITU-T VCEG(ISO/IEC JTC1/SC29/WG11 and ITU-T SG16Q.6), No. JVT-D037, XP-030005311, Jul. 26, 2002, pp. 1-10.

* cited by examiner

*Primary Examiner*—Andy S Rao
(74) *Attorney, Agent, or Firm*—Oblon, Spivak, McClelland, Maier & Neustadt, L.L.P.

(57) ABSTRACT

The invention is related to decoding of block wise coded video pictures. The determination of using de-blocking filtering between coded chroma blocks is based on alternative characteristics compared to the characteristics used in H.264/AVC.

8 Claims, 2 Drawing Sheets

Y           Cr     Cb

|  | | | | | | |
|---|---|---|---|---|---|---|
| Y0 | 0 1 / 3 2 | 0 1 / 3 2 Y1 | 0 1 / 3 2 | 0 1 / 3 2 |

Y2 : 0 1 / 3 2    0 1 / 3 2 : Y3

| | indexA | | | | | | | | | | | | | | | | | | | | | | | | | |
|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| bS = 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 |
| bS = 2 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 |
| bS = 3 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 |

| | indexA | | | | | | | | | | | | | | | | | | | | | | | | | |
|---|---|---|---|---|---|---|---|---|---|---|---|---|---|---|---|---|---|---|---|---|---|---|---|---|---|---|
| | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
| bS = 1 | 1 | 1 | 1 | 1 | 1 | 1 | 2 | 2 | 2 | 2 | 3 | 3 | 3 | 4 | 4 | 4 | 5 | 6 | 6 | 7 | 8 | 9 | 10 | 11 | 13 |  |
| bS = 2 | 1 | 1 | 1 | 1 | 1 | 2 | 2 | 2 | 2 | 3 | 3 | 3 | 4 | 4 | 5 | 5 | 6 | 7 | 8 | 8 | 10 | 11 | 12 | 13 | 15 | 17 |
| bS = 3 | 1 | 2 | 2 | 2 | 2 | 3 | 3 | 3 | 4 | 4 | 4 | 5 | 6 | 6 | 7 | 8 | 9 | 10 | 11 | 13 | 14 | 16 | 18 | 20 | 23 | 25 |

Figure 3

METHOD FOR CHROMA DEBLOCKING

RELATED APPLICATION

This application claims priority under 35 U.S.C. §119 or 365 to Norwegian Application No. 20042477, filed Jun. 14, 2004. The entire teachings of the above application are incorporated herein by reference.

BACKGROUND OF THE INVENTION

Transmission of moving pictures in real-time is employed in several applications like e.g. video conferencing, net meetings, TV broadcasting and video telephony.

However, representing moving pictures requires bulk information as digital video typically is described by representing each pixel in a picture with 8 bits (1 Byte). Such uncompressed video data results in large bit volumes, and can not be transferred over conventional communication networks and transmission lines in real time due to limited bandwidth.

Thus, enabling real time video transmission requires a large extent of data compression. Data compression may, however, compromise with picture quality. Therefore, great efforts have been made to develop compression techniques allowing real time transmission of high quality video over bandwidth limited data connections.

In video compression systems, the main goal is to represent the video information with as little capacity as possible. Capacity is defined with bits, either as a constant value or as bits/time unit. In both cases, the main goal is to reduce the number of bits.

The most common video coding method is described in the MPEG* and H.26* standards. The video data undergo four main processes before transmission, namely prediction, transformation, quantization and entropy coding.

The prediction process significantly reduces the amount of bits required for each picture in a video sequence to be transferred. It takes advantage of the similarity of parts of the sequence with other parts of the sequence. Since the predictor part is known to both encoder and decoder, only the difference has to be transferred. This difference typically requires much less capacity for its representation. The prediction is mainly based on vectors representing movements. The prediction process is typically performed on square block sizes (e.g. 16×16 pixels). Note that in some cases, predictions of pixels based on the adjacent pixels in the same picture rather than pixels of preceding pictures are used. This is referred to as intra prediction, as opposed to inter prediction. Consequently, when the pixels in a block are coded by means of intra prediction, the block is said to be an intra coded.

The residual represented as a block of data (e.g. 4×4 pixels) still contains internal correlation. A well-known method of taking advantage of this is to perform a two dimensional block transform. In H.263 an 8×8 Discrete Cosine Transform (DCT) is used, whereas H.264 uses a 4×4 integer type transform. This transforms 4×4 pixels into 4×4 transform coefficients and they can usually be represented by fewer bits than the pixel representation. Transform of a 4×4 array of pixels with internal correlation will probably result in a 4×4 block of transform coefficients with much fewer non-zero values than the original 4×4 pixel block.

Direct representation of the transform coefficients is still too costly for many applications. A quantization process is carried out for a further reduction of the data representation. Hence the transform coefficients undergo quantization. A simple version of quantisation is to divide parameter values by a number—resulting in a smaller number that may be represented by fewer bits. It should be mentioned that this quantization process has as a result that the reconstructed video sequence is somewhat different from the uncompressed sequence. This phenomenon is referred to as "lossy coding". The outcome from the quantisation part is referred to as quantized transform coefficients.

Entropy coding implies lossless representation of different types of parameters such as overhead data or system description, prediction data (typically motion vectors), and quantized transform coefficients from the quantisation process. The latter typically represent the largest bit consumption.

The coding is performed on block wise parts of the video picture. A macro block consists of several sub blocks for luminance (luma) as well as for chrominance (chroma). There are typically two chrominance components (Cr, Cb) with half the resolution both horizontally and vertically compared with luminance. In FIG. 1, the macro block consists of 16×16 luminance pixels and two chrominance components with 8×8 pixels each. Each of the components is further broken down into 4×4 blocks, which are represented by the small squares. For coding purposes, both luma and chroma 4×4 blocks are grouped together in 8×8 sub blocks and designated Y0-Y3 and Cr, Cb.

The present video standards H.261, H.262, H.263, H.264/AVC, MPEG1, MPEG2, MPEG4 all use blockbased coding. This means blockbased prediction from previously encoded and decoded pictures as well as blockbased coding of residual signal.

Blockbased coding/decoding has proven to be very efficient. However, one of the drawbacks is that the reconstructed image may have visible artifacts corresponding to the blocks used for prediction and residual signal coding. This phenomenon is usually referred to as blocking or blocking artifacts.

SUMMARY OF THE INVENTION

The present invention is related to block wise coded video pictures. The present invention discloses a method in video decoding for reducing blocking artifacts between a first and a second chroma block in a block wise coded video picture, wherein if at least one of the first and second chroma block is intra coded, executing a de-blocking filter operation on pixels adjacent to a boundary between the first and the second chroma block on each side of said boundary, or, if at least one of the first and the second chroma block is included in a collection of adjacent blocks including one or more blocks having non-zero transform coefficients, executing a de-blocking filter operation on pixels adjacent to said boundary between the first and the second chroma block on each side of said boundary.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

In order to make the invention more readily understandable; the discussion that follows will refer to the accompanying drawings and tables.

FIG. 3 is a clipping table from the H.264/AVC specification.

DETAILED DESCRIPTION OF THE INVENTION

Figures 1, 2:
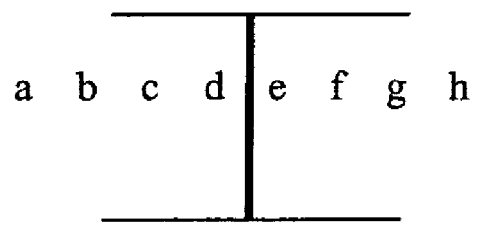
FIG. 1 shows how a macro block of 16×16 luma pixels and the corresponding two chroma components with 8×8 pixels are divided when coded.
FIG. 2 illustrates a boundary between two blocks and a line of adjacent pixel positions.

The present invention is an improvement of prior art method for removal of blocking and quantization noise. This method is described in the specification ITU-T Rec. H.264|ISO/IEC 14496-10 AVC, the basics of which are described in the following.

In H.264/AVC an adaptive deblocking filter is applied in the coding loop. This means that further prediction is performed on filtered images. The filter is designed to remove as much as possible of the blocking and quantization noise and still maintain as much of the image content as possible. It is often a challenge to separate quantization noise and picture content. This is why the filter is highly content adaptive and therefore complex concerning computational operations.

In FIG. 2, an edge between two picture blocks is shown. The letters d and e denotes two adjacent pixel positions on each side of the edge, and the other letters denotes the 6 horizontal pixel positions closest to the two first-mentioned pixels. According to H.264/AVC, pixels b c d e f g may be modified based on the value of each of the pixels and on the characterization of the edge itself. This modification is for equalizing the above-mentioned artifacts. The modification is therefore carried out only when artifacts are likely to occur. Artifacts are said likely to occur between two blocks when one or more of the following situations are detected:

a) If any of the two blocks on each side of the boundary is intra coded, i.e. coded based on already coded blocks in present picture.

b) If any of the two blocks on each side of the boundary includes nonzero transform coefficients.

c) If the size of motion vectors used to predict the blocks on each side of the boundary exceeds a certain threshold.

When the above test indicates blocking artifacts, a smoothing operation is carried out for each pixel line crossing the boundary. The operation starts by calculating a delta value from the pixels close to the boundary. Using the pixel notation defined in FIG. 2, the equation for the delta value is:

$$\Delta = (c - 4d + 4e - f)/8 \quad (1)$$

This delta value then undergoes a clipping procedure resulting in a delta marked value. The delta marked value is dependent on the quantization value that has been used in current coding, i.e. the size of the quantization interval, and on the above-listed criteria. According to H.264/AVC, the clipping is found by a look up in a specified table. FIG. 3 shows an example of such a table from the H.264/AVC specification. In the table, indexA corresponds to quantization value, and bS=1, 2, 3 corresponds to criteria c, b, a, respectively. Consequently, the deciding criteria a, b, c, also state the boundary characteristics. As an example, if the quantization value is 32 and the characteristic of the boundary comply with criterion b, which corresponds to bS=2, the table indicates the value 2. This implies that delta marked should be clipped within the interval {−2,2}. I.e. when delta is greater than 2, delta marked is assigned the value 2, when delta is less than −2, delta marked is assigned the value −2, and when delta lies within {−2,2}, delta marked is assigned the value of delta.

Finally, the delta marked value is used to modify the pixels closed to the boundary. As an example, the new values of d and e are calculated as follows:

$$d' = d + \Delta', \quad e' = e - \Delta' \quad (2)$$

The lists of criteria above are performed on luma blocks, but the result is decided also to apply for the corresponding chroma blocks. The same filtering procedure as described above is used, but on fewer pixels.

Performing deblocking filtering as described above is one of the most resource demanding operations in H.264. The chroma filtering represents a large part of this computational burden, even if the chroma filtering is somewhat simpler. As an example, the chroma filtering has to consider as many edge characteristics as luma filtering since luma edge characteristics is used also for chroma.

It is also usually the case that chroma deblocking filtering result in considerably less subjective quality improvement compared to luma deblocking filtering.

Lastly the present definition of chroma deblocking filtering in H.264 with the dependence of corresponding luma deblocking filtering result in a suboptimal chroma deblocking filtering.

Based on the fact that the need for chroma deblocking filtering is less than for luma deblocking filtering, the present invention discloses a simplified method of determining the boundary characteristics. Chroma deblocking filtering is used less frequently than corresponding luma deblocking filtering, and it should only depend on the characteristics of the chroma coding itself, and not on the luma filtering, which is the case for current H.264/AVC.

According to the present invention, the deciding criteria listed above are replaced by new deciding criteria that are used to decide whether to perform de-blocking filtering or not. As opposed to current H.264/AVC, the criteria apply to chroma block characteristics. In one embodiment of the invention, artifacts are said likely to occur between two blocks when the following situation is detected:

d) At least one of the blocks of each side of the block boundary must be intra coded.

In a second embodiment of the invention, artifacts are said likely to occur between two blocks when the following situations are detected:

e) At least one of the blocks of each side of the block boundary is part of a collection of blocks where nonzero transform coefficients are used for reconstruction of the chroma picture.

Note that the term collection of blocks in the e)-criterion could be one single block for one specific chroma component to a collection of blocks (macroblock) for each chroma component (Cr, Cb) or for several chroma components.

In a third embodiment of the invention, artifacts are said likely to occur between two blocks when a combination of d) and e) occurs.

In preferred embodiments of the invention, for 8×8 Chroma block coding of residual signal a maximum of 2 pixels on each side of the block boundary, i.e., c d e f in FIG. 2, are modified. For 4×4 block coding of residual signal a maximum of 1 pixel on each side of the block boundary, i.e., d e in FIG. 2, are modified.

The calculation of the smoothed edge pixels including delta and clipping is carried out e.g. as described in current H.264/AVC.

However, a simplified table compared to the one shown in FIG. 3 can be used, as the present invention preferably investigate one characteristic. The simplified table for this purpose could be the row corresponding to bS=3 in the table of FIG. 3.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method in video decoding for reducing blocking artifacts between a first and a second chroma block in a block wise coded video picture, comprising:
   if at least one of the first and second chroma block is intra coded, executing a de-blocking filter operation on pixels adjacent to a boundary between the first and the second chroma block on each side of said boundary, or,
   if at least one of the first and the second chroma block is included in a collection of adjacent blocks including one or more blocks having non-zero transform coefficients, executing a de-blocking filter operation on pixels adjacent to said boundary between the first and the second chroma block on each side of said boundary.

2. A method according to claim 1, wherein executing a de-blocking operation further includes:
   for each pixel line crossing said boundary,
      calculating a delta value ($\Delta$) by means of the following equation:

$$\Delta = (c - 4d + 4e - f)/8$$

wherein d is the closest pixel position and c is the second closest pixel position to said boundary in the first chroma block, e is the closest pixel position and f is the second closest pixel position to said boundary in the second chroma block;
      performing clipping of said delta value by a look up in a clipping table having said delta value and a quantization value used when coding the video picture as input and a delta marked ($\Delta'$) as output;
      modifying values of said closest pixel positions by adding or subtracting said delta marked.

3. A method according to claim 1, wherein the collection of adjacent blocks includes one block for one specific chroma component.

4. A method according to claim 1, wherein the collection of adjacent blocks includes a collection of blocks (macroblock) for each chroma component (Cr, Cb) or for several chroma components.

5. A method in video decoding for reducing blocking artifacts between a first and a second chroma block in a block wise coded video picture, comprising:
   if at least one of the first and second chroma block is intra coded, executing a de-blocking filter operation on pixels adjacent to a boundary between the first and the second chroma block on each side of said boundary, wherein executing a de-blocking operation further includes:
   for each pixel line crossing said boundary,
      calculating a delta value ($\Delta$) by means of the following equation:

$$\Delta = (c - 4d + 4e - f)/8$$

wherein d is the closest pixel position and c is the second closest pixel position to said boundary in the first chroma block, e is the closest pixel position and f is the second closest pixel position to said boundary in the second chroma block;
      performing clipping of said delta value by a look up in a clipping table having said delta value and a quantization value used when coding the video picture as input and a delta marked ($\Delta'$) as output;
      modifying values of said closest pixel positions by adding or subtracting said delta marked.

6. A method in video decoding for reducing blocking artifacts between a first and a second chroma block in a block wise coded video picture, comprising:
   if at least one of the first and the second chroma block is included in a collection of adjacent blocks including one or more blocks having non-zero transform coefficients, executing a de-blocking filter operation on pixels adjacent to said boundary between the first and the second chroma block on each side of said boundary, wherein executing a de-blocking operation further includes:
   for each pixel line crossing said boundary,
      calculating a delta value ($\Delta$) by means of the following equation:

$$\Delta = (c - 4d + 4e - f)/8$$

wherein d is the closest pixel position and c is the second closest pixel position to said boundary in the first chroma block, e is the closest pixel position and f is the second closest pixel position to said boundary in the second chroma block;
      performing clipping of said delta value by a look up in a clipping table having said delta value and a quantization value used when coding the video picture as input and a delta marked ($\Delta'$) as output;
      modifying values of said closest pixel positions by adding or subtracting said delta marked.

7. A method according to claim 6, wherein the collection of adjacent blocks includes one block for one specific chroma component.

8. A method according to claim 6, wherein the collection of adjacent blocks includes a collection of blocks (macroblock) for each chroma component (Cr, Cb) or for several chroma components.

* * * * *